United States Patent [19]

Kinder

[11] 4,312,379
[45] Jan. 26, 1982

[54] PRESSURE ACTUATED MULTIWAY VALVE

[75] Inventor: Mark R. Kinder, Lafayette, Ind.

[73] Assignee: TRW Inc., Cleveland, Ohio

[21] Appl. No.: 152,550

[22] Filed: May 23, 1980

Related U.S. Application Data

[62] Division of Ser. No. 878,564, Feb. 16, 1978, Pat. No. 4,223,646.

[51] Int. Cl.³ .............................................. F16K 11/02
[52] U.S. Cl. .............................. 137/625.48; 137/495; 137/596.12
[58] Field of Search ............. 60/625.6, 625.61, 625.62, 60/625.63, 625.64, 625.48, 495, 596.12

[56] References Cited

U.S. PATENT DOCUMENTS

| | | | |
|---|---|---|---|
| 2,621,676 | 12/1952 | Loft | 137/622 |
| 2,985,181 | 5/1961 | Nixon | 137/85 |
| 3,210,938 | 10/1965 | Mendez | 60/39.27 |
| 3,568,718 | 3/1971 | Wilke et al. | 137/625.6 |
| 3,695,293 | 10/1972 | Zeuner | 137/625.48 |
| 3,726,302 | 4/1973 | Lawsing | 137/117 |
| 3,736,960 | 6/1973 | Cohen | 137/625.6 |
| 4,209,040 | 6/1980 | Peters | 137/625.48 |

Primary Examiner—Wendell E. Burns
Attorney, Agent, or Firm—Yount & Tarolli

[57] ABSTRACT

A hydraulic motor drives the cooling fan of an internal combustion engine. Fluid flow from a fixed displacement pump is directed through a pilot-operated pressure-compensated control valve to the hydraulic motor. The valve has a continuous bias to a fan-on position for directing fluid to the fan motor. Flow to the fan motor is diverted by the valve as a function of the pressure of the fluid in the system. In addition, flow to the fan motor is diverted as a function of a pilot pressure signal which is controlled by the temperature of the engine coolant fluid. The valve failsafes to a condition directing maximum flow to the fan motor in the event of loss of pilot fluid pressure.

9 Claims, 10 Drawing Figures

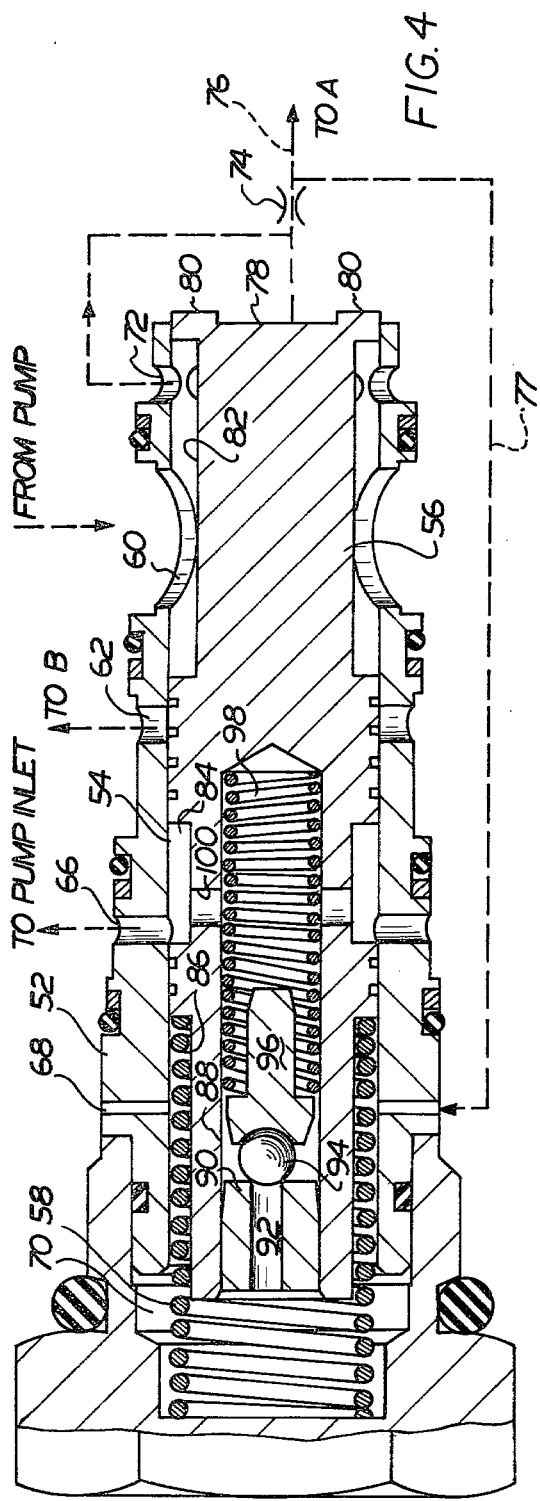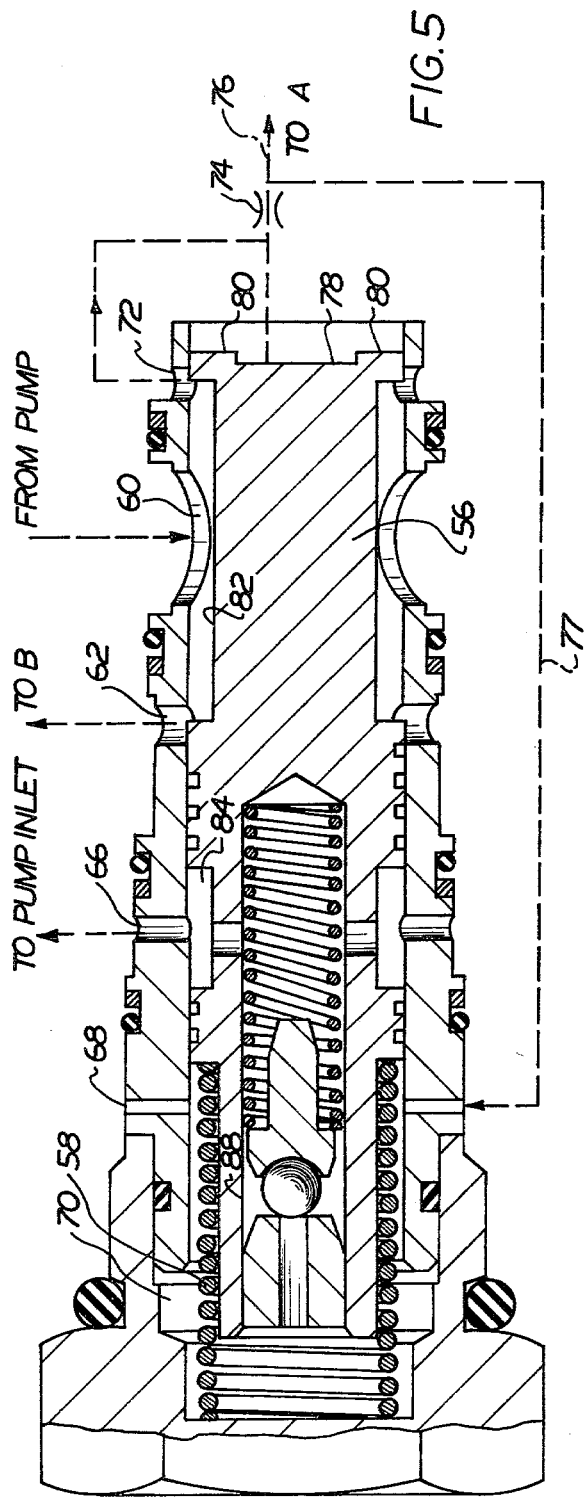

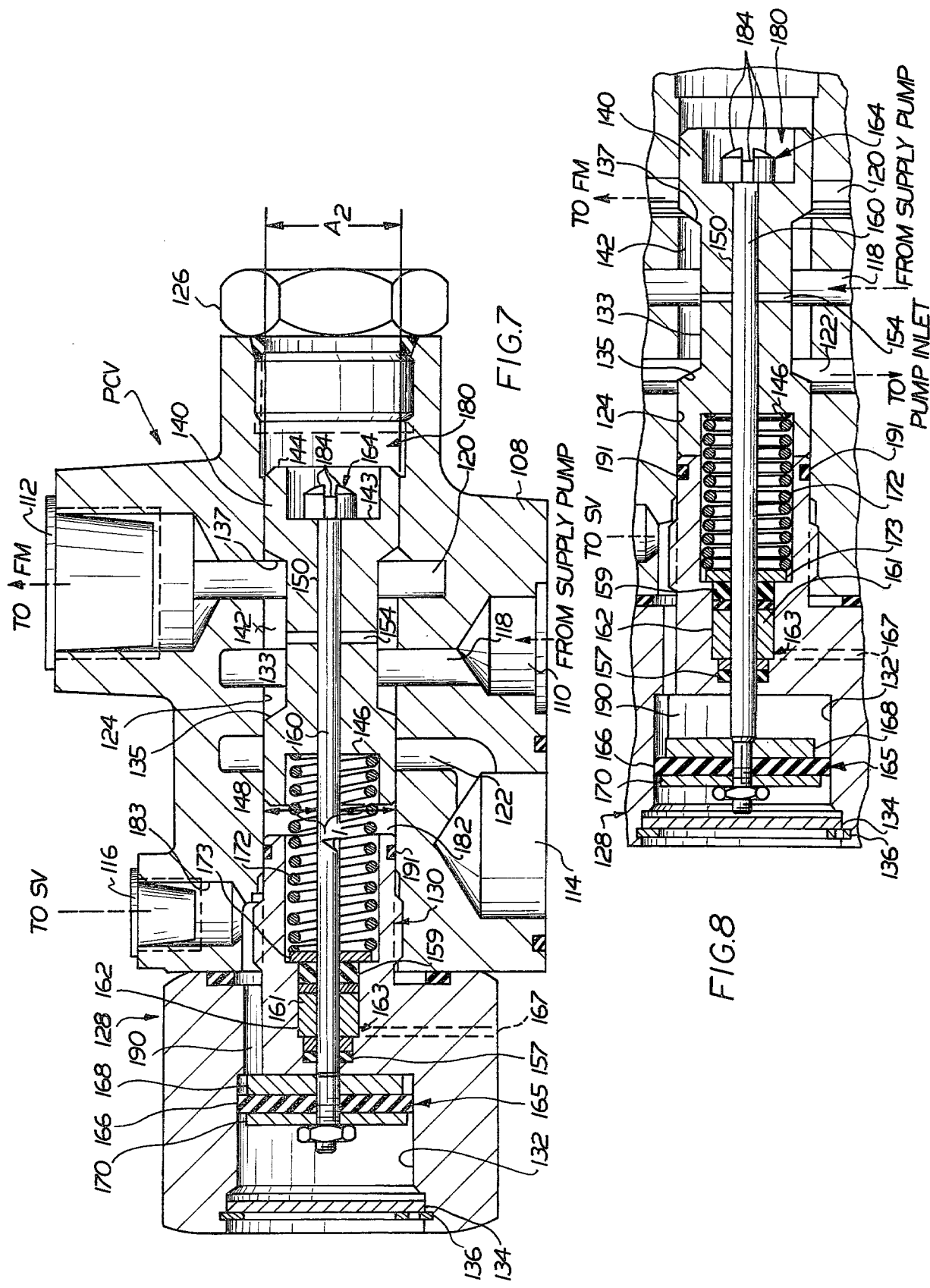

4,312,379

PRESSURE ACTUATED MULTIWAY VALVE

This is a division, of application Ser. No. 878,564 filed Feb. 16, 1978 now U.S. Pat. No. 4,223,646 issued Sept. 23, 1980.

BACKGROUND AND SUMMARY OF THE INVENTION

This invention relates generally to hydraulic apparatus for controlling fluid flow to a hydraulic motor. In particular, it relates to a hydraulic system for controlling fluid flow to a rotary motor which drives a cooling fan associated with a vehicle cooling system, and to a pilot-operated pressure-compensated valve which is used in the system.

The cooling fan for a vehicle engine has been driven mechanically from the engine crankshaft, either directly or through a friction clutch. Automotive engineers have recognized for some time that there are problems involved with driving cooling fans in such a manner. In particular the problems involve excessive use of fuel and excessive noise. One attempt at solving these problems has been through the use of viscous fluid drives for driving the fan. However, viscous fluid drives also have presented significant engineering problems. Fan drive systems and the problems relating to the design thereof and disclosed and discussed at length in the article "Fan Clutches a Must For Heavy Trucks", Automotive Engineering Magazine, April 1975.

Another suggested solution to the fan drive problem centers around driving the fan with a hydraulic motor and controlling the hydraulic motor so that the fan is not driven when fan cooling is unnecessary, such as at high vehicle speeds. U.S. Pat. Nos. 3,650,567; 3,942,486; 3,217,697 and 2,769,394 disclose systems having hydraulic motors for driving a fan.

The present invention provides an improved fan drive system utilizing a hydraulic motor for driving the fan. In particular, the present invention provides a hydraulic system which includes a pilot-operated pressure-compensated control valve for controlling flow from a fluid source to the fan motor. The valve has a valve element for controlling flow between an inlet port, an outlet port in fluid communication with the fan motor, and a bypass port in fluid communication with a reservoir. The valve element is biased to a full open position to direct flow of fluid to the fan motor. The valve element is moved toward a closed position to divert flow to the reservoir in response to a pilot pressure signal. The pilot pressure signal is controlled by engine coolant temperature. The pilot pressure signal controls the valve element to divert flow to the reservoir when coolant temperature is below a predetermined minimum. Thus, when fan cooling of the engine is unnecessary, the fan motor is not driven.

The pilot-operated pressure-compensated control valve is designed to respond to pressure spikes or surges in the system to divert fluid from the outlet port to the bypass port. As a result of this construction, the valve provides a protection for the hydraulic motor. This constitutes a substantial improvement over prior art fan drive systems which have not included a pilot-operated valve having such functions.

Further, the pilot-operated pressure-compensated control valve is constructed so that it always allows at least a predetermined minimum flow from the source to the hydraulic fan motor. Thus, there is always a pressure maintained on the fan motor. The fan is therefore free to rotate due to the ram air impacting thereon and such rotation of the fan can occur without cavitation occurring in the hydraulic fan motor. Further, when it is desired to drive the fan by the hydraulic motor lower inertia forces need be overcome as compared to a system where the fan is stopped.

Accordingly, the present invention provides a pilot-operated pressure-compensated control valve which functions (1) to control the flow of fluid to the hydraulic fan motor in response to coolant temperature, (2) to respond to pressure spikes or surges in the system to divert fluid from the hydraulic fan motor, and (3) to maintain at least a minimum level of fluid flow from a fluid source to the hydraulic fan motor when the fan motor is not driving the fan.

As noted above, the pilot-operated pressure-compensated control valve has significant advantages when used to control flow to a fan motor. It may also be used in other fluid systems where the need arises.

Further, the present invention provides a combined steering and fan drive system in which fluid flow from a fixed displacement supply pump is directed to independent steering and fan motor drive systems under the control of a priority flow divider valve. The priority flow divider valve insures a predetermined amount of flow to the steering systems and excess flow to the fan drive system. Flow from the priority valve to the fan motor drive system is directed to the pilot operated pressure-compensated valve discussed above.

BRIEF DESCRIPTION OF THE DRAWINGS the features and advantages of the present invention will become further apparent from the following detailed description taken with reference to the accompanying drawings wherein:

FIGS. 4, 5 and 6 are longitudinal sectional views of the priority flow divider valve, illustrated in certain of its operating positions;

FIG. 7 is a longitudinal sectional view of the pilot-operated pressure-compensated, flow control valve constructed according to the present invention, illustrated in one of its operating positions;

FIG. 8 is a fragmentary sectional view of the pilot-operated pressure-compensated flow control valve in another of its operating positions;

DETAILED DESCRIPTION OF THE PREFERRED EMBODIMENT OF THE INVENTION

Figure 1:
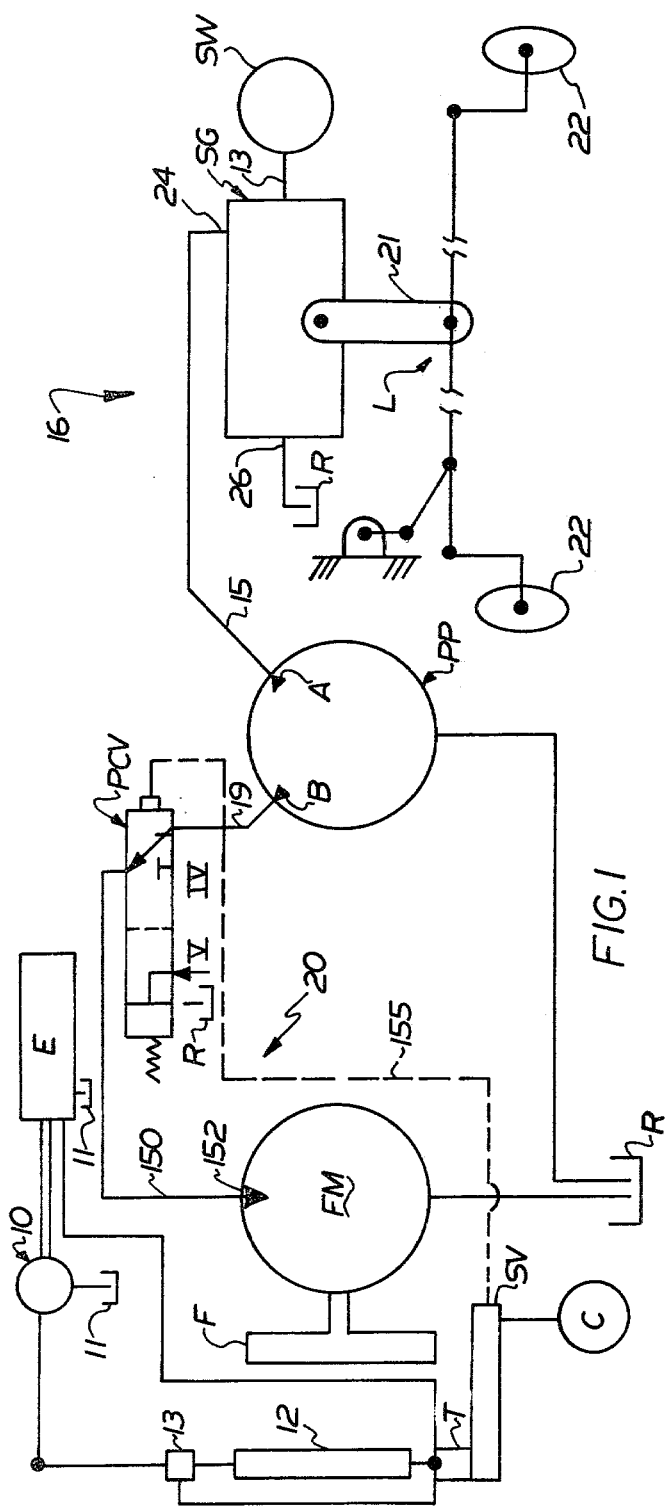
FIG. 1 is a schematic representation of a hydraulic system constructed in accordance with the principles of the present invention.

As noted above, the present invention relates to hydraulic apparatus for controlling operation of a hydraulic motor and in particular for controlling operation of a fan motor for a vehicle cooling system. As shown in FIG. 1, a vehicle cooling system includes an engine driven pump 10 which draws coolant fluid from a reservoir 11 and circulates the coolant fluid through the engine E. The coolant fluid is directed through the radiator 12 under the control of thermostatic control means 13 of known construction.

The cooling fan F is disposed adjacent the radiator 12. In operation, the fan F draws air across the radiator 12 to assist in effecting cooling of the fluid in the cooling system. The fan F is driven by the rotary output shaft of a fan motor FM. The fan motor FM is preferably a uni-directional rotary hydraulic gear motor of known construction.

Figure 9:
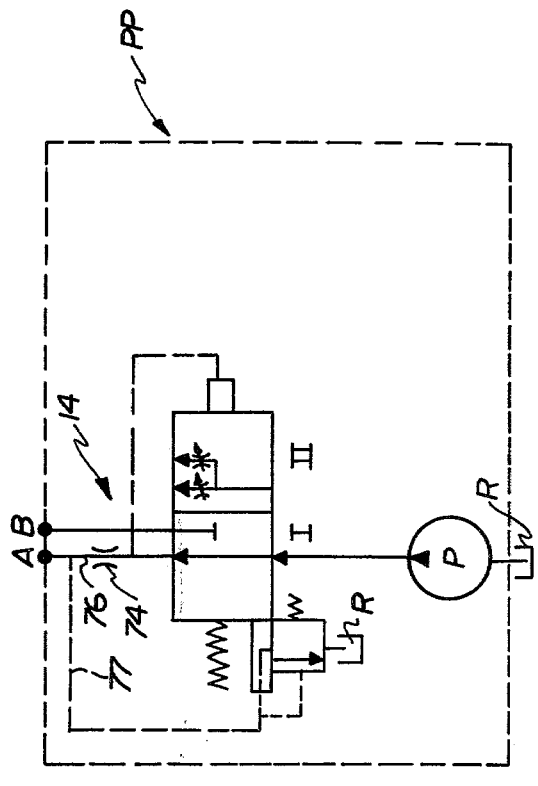
FIG. 9 is a schematic illustration of the priority flow divider pump circuitry according to the preferred embodiment of the invention.

Referring to FIGS. 1 and 9, the fan motor FM is provided with fluid flow from a priority flow divider pump PP. The pump PP includes a fixed displacement gear pump P which draws low pressure fluid from a reservoir R and delivers high pressure fluid to outlet ports A, B under the control of a priority flow control valve 14. Flow through port A is directed to a conduit 15 of a vehicle power steering system 16. The power steering system 16 may be of different types, such as an integral power steering gear type or it may be a hydrostatic type steering system. It is shown herein as an integral power steering gear system. Flow through port B is directed to conduit 19 of a fan motor system 20 for driving the cooling fan F.

In accordance with the invention, a pilot-operated pressure-compensated control valve PCV operates to control fluid flow from outlet port B of the pump to the fan motor FM. When fan cooling is unnecessary the valve PCV is actuated by a pilot fluid pressure to a condition diverting flow in excess of a predetermined minimum away from the fan motor so that the fan is not driven when fan cooling is unnecessary. When fan cooling is needed, the valve is actuated by the pilot fluid pressure to increase flow to the fan motor to drive the fan. The valve is further constructed to compensate for pressure surges in the fan motor system to divert fluid away from the fan motor to protect the fan motor.

The power steering system 16 includes an integral power steering gear SG. The steering gear includes an input shaft 13 connected to the vehicle steering wheel SW, and further includes a mechanism of known construction connected with the input shaft 13. The mechanism responds to rotation of input shaft 13 to operate a steering arm 21. The steering arm 21 is connected to the vehicle wheels 22 by linkage L of known construction.

The steering gear SG includes a fluid inlet 24 for receiving fluid from conduit 15 and a fluid outlet 26 for returning fluid to the reservoir R. The steering gear also includes a valve for directing pressure fluid at inlet 24 to a fluid motor for providing a power assist for operating the steering arm 21, as is well known. Thus, rotation of the steering wheel SW directs fluid in the steering system in a manner which assists in effecting movement of the vehicle wheels 22.

The priority flow divider valve 14, described more fully hereinafter, insures that all flow from the pump up to a predetermined flow rate is directed to the steering system 16. Flow above the predetermined rate is directed to the fan motor system 20. Low pressure fluid discharged from both the fan motor and the steering gear is returned to the reservoir R while bypassing the motor of the other system. Thus, steering system 16 and fan motor system 20 are independent fluid systems.

Priority Flow Divider Pump

Figure 2:
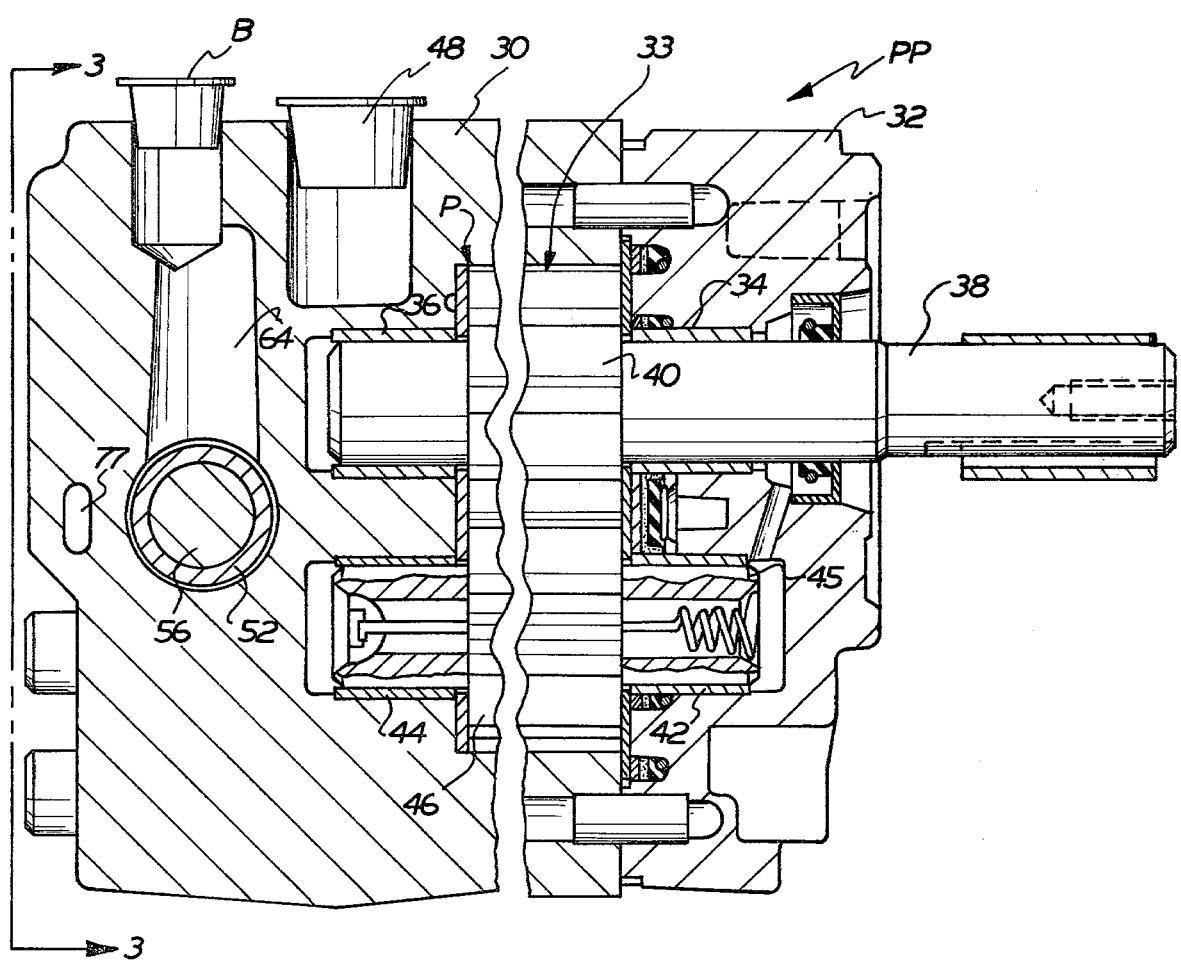
FIG. 2 is a sectional view of a fixed displacement pump having a priority flow divider valve integral therewith for use in a system according to the preferred embodiment.

Referring to FIG. 2, the priority flow divider pump PP includes a fixed displacement gear pump P. The gear pump P includes a pair of housing members 30, 32 forming a pumping chamber 33. A first pair of axially aligned bushings 34, 36 rotatably support a driven shaft 38 having a first gear 40 integral therewith. A second pair of axially aligned bushings 42, 44 rotatably support a shaft 45 having a driven gear 46 integral therewith which meshes with the gear 40. The gears 40, 46 are located in the pumping chamber 33.

Figure 3:
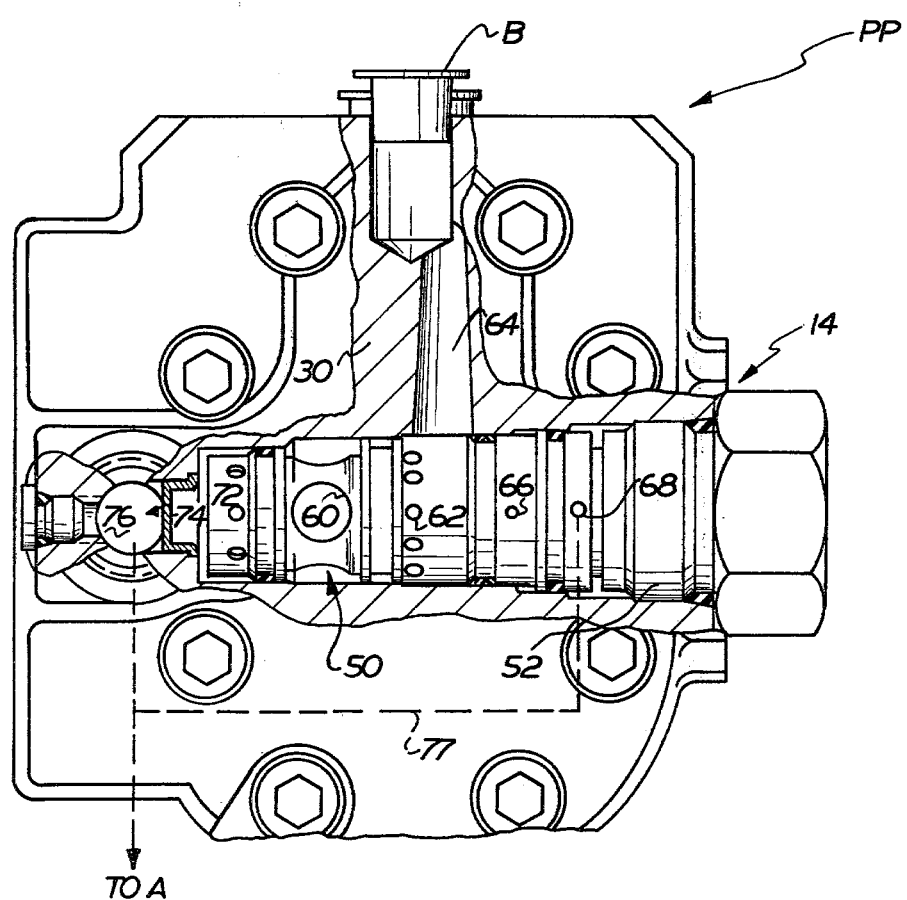
FIG. 3 is an end view of the pump of FIG. 2 as indicated by the line 3—3 in FIG. 2 with portions of the housing broken away to show a portion of the priority flow divider valve.

The pumping chamber 33 communicates with a pump inlet 48 (FIG. 2) by passages not shown. Inlet 48 is connected to reservoir R. Rotation of gear members 40, 46 draws low pressure fluid through inlet port 48 and directs high pressure fluid to a high pressure discharge chamber 50 (FIG. 3).

Figure 6:
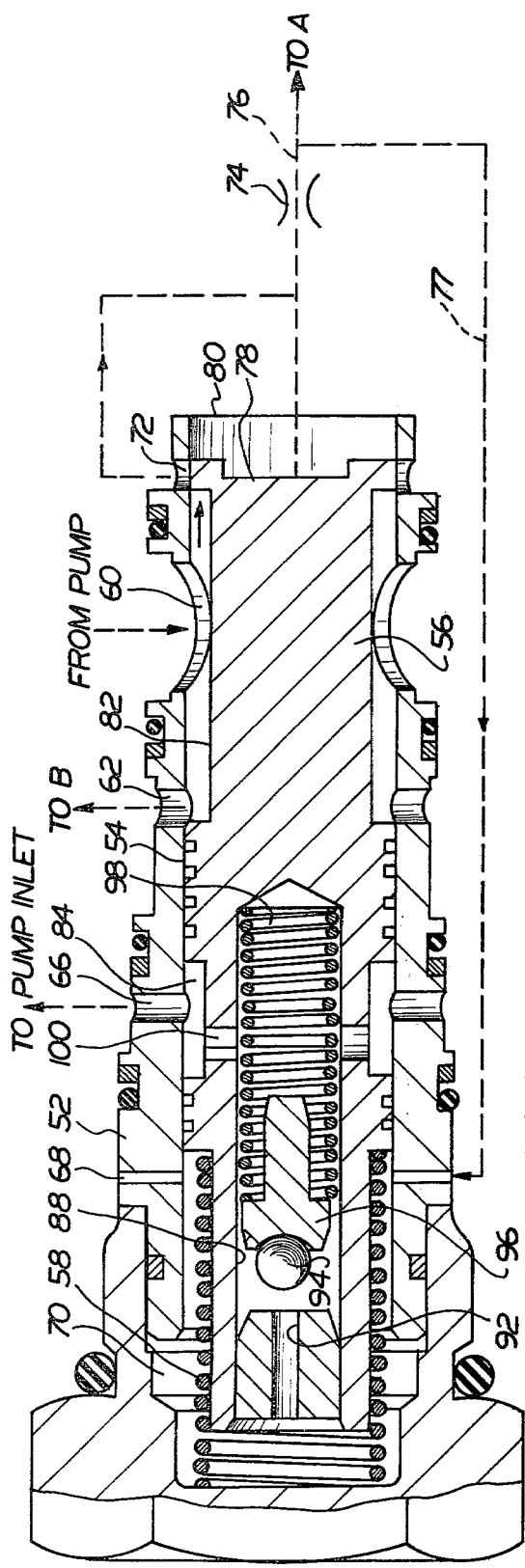

Referring to FIGS. 3-6, the priority flow divider valve 14 includes a housing portion 52 disposed in the pump housing 30. The housing portion 52 includes an axially extending bore 54. A valve spool 56 is axially movable in the bore 54. The spool 56 is biased in one axial direction (rightwardly as seen in FIGS. 4-6) by means of spring 58.

The valve housing portion 52 includes one or more radially directed inlet passages 60 which communicate with the pump discharge chamber 50. The valve housing portion 52 further includes a plurality of radially directed passages 62 communicating with bore 54. Passages 62 communicate with a fluid passage 64 connected to outlet port B.

Stil further, the valve housing 52 includes radial passages 66 which communicate with the valve bore 54. Passages 66 also communicate with the inlet side of the pump (by means not shown). Additionally the valve includes radial passages 68 which communicate with a chamber 70 at one end of the valve spool 56.

A further series of radial passages 72 are formed in the housing portion 52. Radial passages 72 communicate with valve bore 54 and with the upstream side of a fixed orifice 74 (FIG. 3) of predetermined size. The downstream side of orifice 74 is connected with conduit 76 which directs fluid to outlet port A.

Orifice 74 is sized to produce a predetermined pressure drop thereacross. A passage 77 (shown in dashed lines in FIGS. 4-6) communicates fluid pressure from conduit 76 with radial passages 68 and thereby with chamber 70. Pressure upstream of the orifice 74 acts against end surfaces 78, 80 of the valve spool 56.

The valve spool 56 includes annular fluid passageways 82, 84 and 86. The valve spool 56 also includes a central bore 88. A plug 90 is disposed in bore 88, and includes an axial passageway 92 extending therethrough. A ball 94 is seated in a member 96 which is biased by spring 98 in a direction urging the ball 94 into sealing engagement with one axial end of the fluid passage 92. A radial passageway 100 in the valve spool connects the central bore 88 with the annular passageway 84 formed in the valve spool.

The valve spool 56 is biased in one axial direction toward the position shown in FIG. 4 by means of the spring 58. In this position annular groove 82 connects high pressure discharge passage 60 with passages 72, and radial passages 62 are blocked. All flow from the high pressure side of the pump is thus directed to port A through the fixed orifice 74 and the conduit 76. This is the valve position shown at I in FIG. 9.

Flow through the orifice 74 creates a pressure differential across the valve spool 56. Fluid pressure upstream of the orifice 74 acts against valve end surfaces 78,80 to urge the spool in one axial direction. Fluid pressure downstream of the orifice 74 is communicated with chamber 70 and acts on the valve spool to urge the valve spool in an opposite direction. The pressure differential produces a resultant force on the spool 56 acting against the force of spring 58. When the flow rate is above a predetermined amount the pressure differential across the valve spool 56 shifts the valve spool from its FIG. 4 position toward a position such as shown in FIG. 5. In the position shown in FIG. 5, the annular passage 82 communicates passage 60 with passages 62 and 72 thus directing fluid to both ports A and B. This condition is illustrated at II in FIG. 9.

If fluid pressure downstream of orifice 74 becomes high enough, the ball check valve 94, may be unseated. The chamber 70 would then be vented through passageways 100, 84 and 66 to the low pressure inlet side of the pump. This results in a rapid drop in pressure in the chamber 70 and thereby results in leftward movement of the valve spool 56 to the position of FIG. 6. In this position the amount of flow directed to port A is substantially reduced and the amount of flow directed to port B is substantially increased.

As should be apparent from the above the foregoing valve construction operates to direct all pump flow to the steering system port A until a predetermined flow rate through the orifice 74 is obtained. Thereafter, the valve maintains a substantially constant flow rate to the steering system port A and directs all flow above the constant rate to the fan motor system.

Pilot-Operated Pressure-Compensated Control Valve

Referring to FIG. 7, the pilot control valve PCV includes a housing 108. Housing 109 includes an inlet port 110, an outlet port 112 and an bypass port 114. Housing 108 also includes a pilot port 116. Inlet port 110 communicates with passageway 118 in the housing. Oulet port 112 and bypass port 114 communicate, respectively, with passageways 120 and 122 in the housing.

A valve spool 140 is movable between various positions in which it directs fluid from the inlet port 110 to the outlet port 112 (and thereby to the fan motor), or diverts flow from the inlet port 110 to the bypass port 114 when driving of the fan is unnecessary. The valve spool 140 further moves to restrict flow to the outlet port 112 in order to avoid pressure surges acting on the fan motor FM.

Referring to FIGS. 7 and 8, the control valve housing 108 includes an axially extending bore 124. The axially extending bore 124 is in fluid communication with inlet passageway 118, outlet passageway 120 and bypass passageway 122. The passageways 118, 120, 122 communicate with inlet port 110, outlet port 112 and bypass port 114, respectively. A plug 126 is fixed to housing 108 and forms a closure member which seals one axial end of the bore 124. Another plug 128 is fixed to the housing 108 and includes a portion 130 which forms another closure member which extends into the other axial end of the bore 124. The plug 128 includes a central bore 132 closed at one end by a metal disc 134 and a snap ring 136.

The valve spool 140 is axially slidable in the bore 124. The outer periphery of valve spool 140 includes an axially extending fluid passageway 142 which directs fluid between the passages 118, 120 and 122. Fluid passageway 142 is formed by a groove extending circumferentially around the spool and including an axial surface 133 connecting a pair of radial surfaces 135, 137. Valve spool 140 also includes radial surfaces 143 and 144 at one axial end (the right end in FIG. 7), and radial surfaces 146 and 148 at the other axial end.

Additionally, valve spool 140 includes a central bore 150 extending axially therethrough, and a radially extending fluid passageway 154 extending between axial surface 133 and central bore 150.

An axially extending shaft 160 extends through the central bore 150. The valve spool is slidable on the shaft 160. Shaft 160 is slidable in an axial bushing 161 disposed in a bore 162 in the closure member 130. Sealing members 157 and 159 disposed between the bore 162 and the shaft 160 on opposite sides of the bushing 161 form a space 163 therebetween. A radial passage 167 in closure member 130 communicates space 163 with atmosphere.

Shaft 160 includes an enlarged head 164 at one axial end. The other axial end of the shaft 160 has a piston 165 fixed thereto. Piston 165 is slidable in the bore 132 in the plug 128. Piston 165 is preferably formed by a dynamic sealing member 166 disposed between a pair of metal plates 168, 170.

One end of a helical spring 172 acts against end surface 146 of the valve spool. The other end of the spring acts against a member 173 abutting the fixed closure member 130. The spring 172 continuously urges valve spool 140 against the enlarged head 164 and thus continuously urges the shaft 160 and piston 165 toward the right as viewed in FIG. 7. The piston 165 in fact is urged into abutment with the closure member 130 in the FIG. 7 position.

Fluid reaction chambers are formed at each axial end of the valve spool. One reaction chamber 180 is defined by the closure member 126, the valve end surface 144, a portion of valve end surface 143, and the enlarged head 164. Another fluid reaction chamber 182 is formed at the other axial end of the valve spool. The fluid chamber 182 is defined by the axial end surfaces 146, 148 of the valve spool, and the closure member 130.

Both axially spaced fluid chambers 180, 182 are in continuous fluid communication with fluid flowing through axial passageway 142 in the valve spool. This is achieved by providing sufficient clearance (not shown) between the shaft 160 and the bore 150 in the valve spool to establish fluid communication between passageway 154 in the valve spool and the fluid chambers 180, 182.

The fluid pressure in chambers 180, 182 produces a force differential across valve spool 140. Specifically, as seen in FIG. 7, the fluid pressure in chamber 182 acts against surfaces having an annular area. The annular area extends from the outer periphery of the spool to the central bore 150 as shown at $A_1$ in FIG. 7. The fluid pressure in chamber 180 acts against surfaces having an effective area which extends the entire diameter of the valve spool, as shown at $A_2$. Since shaft 160 extends through the chamber 182, the area extending the distance $A_2$ is greater than the area extending the distance $A_1$ by an amount determined by the cross sectional area of the bore 150. Thus, fluid pressure communicated to the chambers 180, 182 produces a resultant force on the valve spool 140 tending to urge the valve spool 140 to the left in FIGS. 7, 8. The spring 172, of course, continuously biases the valve spool 140 in opposition to the resultant force.

The pilot controlled valve PCV is thus pressure compensated to automatically control fluid flow in response to pressure surges or spikes in the system. In response to a pressure surge of a predetermined magnitude through the valve spool passage 142, a sharply increased pressure is communicated to the chambers 180, 182. This pressure acts on the unequal reaction surface areas and sharply increases the resultant force acting on the valve spool 140. The resultant force, if sufficient, moves the valve spool 140, the shaft 160, and piston 165 axially against the bias of the spring 172 to divert flow from the outlet port to the bypass port to compensate for the pressure surge. For example, when the valve spool is in the FIG. 7 position, a pressure surge of sufficient magnitude in the system would move the valve spool 140 leftwardly, restricting flow to the outlet port 112 and increasing flow to the bypass port 114.

The foregoing valve construction also results in the valve spool being viscous damped. Fluid pressure in the chambers 180, 182, at the ends of the valve spool resists movement of the spool in either direction, thus serving to damp the valve spool against oscillation.

The valve PCV, as noted, is pilot operated. Specifically, the valve spool 140 may be moved to block flow to the fan motor under certain conditions. To this end a pilot fluid pressure chamber 190 is formed between the housing 108, the closure member 130 and one side of the piston 165. The other side of the piston 165 communicates with atmosphere through leakage paths formed between the snap ring 136 and metal washer 134. The pilot fluid pressure chamber 190 communicates with pilot port 116 through passage 183 in the housing 108. An O-ring 191 between the closure portion 130 and the housing 108 forms a static seal between part of the pilot fluid pressure chamber 190 and the fluid chamber 182. Fluid from chamber 190 which leaks through seal 157 into space 163 is vented to atmosphere through passage 167. Thus, pilot pressure chamber 190 is sealed against leakage to chamber 182. Fluid pressure in pilot chamber 190 urges the piston, and thereby th valve spool 140, in an axial direction against the continuous bias of spring 172.

As noted above, the spring 172 continuously biases the valve spool 140 toward the position of FIG. 7. In that position, all flow at the inlet port 110 is directed through groove 142 to the outlet port 112 and then to the fan motor. Flow through bypass port 114 is blocked. That valve position is also known at IV in FIG. 1.

In response to an increased pressure in the pilot fluid chamber chamber 190 the piston 165 and the valve spool 140 are moved axially from the position of FIG. 7 toward the position of FIG. 8. Such movement of the valve spool restricts fluid flow from the inlet port 110 to the outlet port 112, and diverts fluid flow to the bypass port 114. If the valve spool is moved to the FIG. 8 position, it diverts most fluid flow to bypass port 114, but insures a minimum predetermined amount of flow to outlet port 112. This condition is also shown at V in FIG. 1. Pilot controlled movement of the valve spool to positions between the extreme positions of FIGS. 7 and 8 would meter fluid flow to both the outlet port 112 and the bypass port 114.

System Operation

In the system shown in FIGS. 1 and 9, the priority valve 14 directs all flow below a predetermined flow rate to the steering system through port A, and flow in excess of the predetermined rate to the fan drive system through port B. The pump P is sized to provide adequate flow for both the steering system and the fan drive system at minimum engine speed.

The inlet port 110 of the pilot-operated pressure-compensated control valve PCV is connected to the valve port B through conduit 19. Conduit 150 connects the outlet port 112 of the valve PCV to the high pressure inlet 152 of fan motor FM. The bypass port 114 of the valve PCV is connected to the pump inlet.

The spring 172 biases the pilot-operated pressure-compensated control valve PCV toward the condition of FIG. 7 (position IV in FIG. 1), in which it directs all flow from the inlet port 110 to the outlet port 112, and flow to the bypass port 114 is blocked.

The pressure in the pilot fluid pressure chamber 190 is controlled by a fluid system separate from the fan motor system. One end of a pilot conduit 155 is connected with pilot port 116 of the pilot-operated pressure-compensated control valve PCV. Thus, fluid pressure in the conduit 155 is communicated to the pilot fluid pressure chamber 190 and acts against piston 165.

In the preferred embodiment, vehicle air pressure is used to provide the pilot pressure signal. A valve SV of known construction is biased to a wide open condition establishing maximum fluid communication of air from the vehicle compressor C with the conduit 155, and thereby with pilot port 116 of valve PCV. Such a valve is commercially sold by companies such as Standard Thomson Corp., 152 Grove St. Watham, Mass., and Kysor of Cadillac, 1100 Wright St., Cadillac, Mich. (a Kysor No. 1043-36000-29. SHUTTERSTAT valve may be used).

The air pressure due to valve SV being open biases pilot control valve PCV toward the FIG. 8 position (the position V in FIG. 1) in which most fluid is diverted to the bypass port, but at least a minimum predetermined flow is directed to the fan motor. When the temperature of the engine coolant is low enough, and fan motor operation is not necessary, the pilot pressure places the pilot-operated pressure-compensated control valve PCV in the foregoing condition. The minimum predetermined flow directed to the fan motor insures a positive pressure on the motor, and the fan may rotate essentially due to the effect of ram air thereon without cavitation.

When fan operation is necessary, the valve SV is closed under the control of a thermal sensor T of known construction. The sensor T is positioned to continuously sense the temperature of the coolant fluid. The thermal sensor T preferably comprises a conventional wax motor which expands and contracts in response to the temperature of the coolant fluid. In the preferred embodiment, the thermal sensor T is integrally connected with the valve SV. When the temperature of the coolant fluid rises to a predetermined level, the wax motor expands and closes the valve SV, thus shutting off fluid communication of pressurized air to the conduit 155. An atmospheric vent in the valve SV allows air to slowly bleed from the pilot conduit 155, thereby allowing spring 172 to slowly move the pilot-operated pressure-compensated control valve toward the FIG. 7 position. This results in a gradual increase in the flow to the rotary fan motor FM.

When the temperature of the coolant fluid drops below a predetermined level the contraction of the wax motor of thermal sensor T results in the atmosphere vent closing, and the valve SV thereafter moving toward the wide open condition to increase air pressure in the conduit 155. This increases pressure in the pilot chamber 190 to shift pilot-operated pressure-compensated control valve PCV toward the FIG. 8 position in which it diverts most fluid flow to the bypass port, but maintains at least a minimum predetermined flow of fluid to the fan motor.

Figure 10:
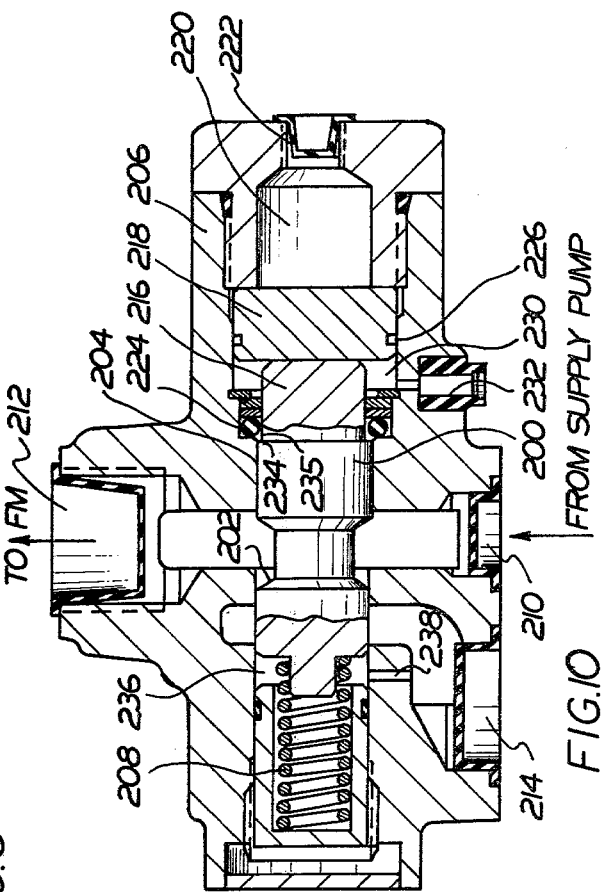
FIG. 10 is a longitudinal sectional view of an alternative pilot-operated pressure-compensated flow control valve which has been suggested for use in a system according to the invention.

Alternative Pilot-Operated Pressure-Compensated Valve Suggested For Use In The System According To The Invention An alternative pressure compensated, pilot operated valve has been suggested for use in a system according to the invention. The alternative construction is shown in FIG. 10. The valve includes a spool 200 having an annular fluid passageway 202. The spool is axially slidable in a stepped bore 204 formed in a housing 206. A spring 208 urges the spool 200 toward the position shown in FIG. 10 directing all fluid from an inlet port 210 to an outlet port 212, and blocking flow to a bypass port 214.

The valve spool 200 includes an integral extension 216 having a smaller diameter than the valve spool. The extension 216 abuts one side of a pilot piston 218. A pilot pressure chamber 220 on the other side of the pilot piston communicates with a pilot pressure port 222. Pressure in the pilot chamber 220 urges the pilot piston 218 against the valve spool extension 216 to urge the valve spool against the bias of the spring 214.

A seal 224 is disposed between the outer surface of the valve spool extension 216 and a wall of the stepped bore 204. A seal 226 is disposed between the pilot piston 218 and another wall of the stepped bore 204. The space 230 between the seals 226, 228 communicates with atmosphere through a passagae 232 in the housing.

Because the valve spool extension 216 has a smaller diameter than the valve spool, an annular radially directed surface 234 is formed at an end of the valve spool. The seal 224 helps form a fluid chamber 235 which includes annular surface 235 at the one end of the spool. There is fluid communication between the passageway 202 and the chamber 235 through clearances between the spool and the bore 204. The space at the other end of the spool communicates with the bypass port through a passage 236 in the housing. In response to a pressure surge in the system, increased pressure in chamber 235 acts against the annular reaction surface 234 to urge the valve spool against the bias of the spring (i.e. leftwardly in FIG. 10) to divert flow from the inlet port to the bypass port.

The valve construction shown in FIG. 10 has been suggested by Snap-Tite, Inc., Union City, Pa. 16438 as an alternative valve construction for the applicant's valve disclosed above, particularly for use in a system according to the present invention.

In summary, the hydraulic system described above includes a fixed displacement pump for drawing low pressure fluid from a fluid source and for discharging high pressure fluid to the independent steering and fan motor systems under the control of a priority flow control valve which insures flow to the steering system up to a predetermined flow rate and excess flow to the fan motor system. A pilot-operated pressure-compensated flow control valve upstream of the fan motor includes an inlet port connected with the discharge side of the pump (through the priority flow control valve), an outlet port connected with the fan fluid motor and a bypass port. The pilot-operated pressure-compensated valve is continuously biased toward a predetermined flow control condition. A pilot fluid pressure acts against the continuous bias to move the valve member for controlling fluid flow between the inlet port the outlet port and the bypass port. The magnitude of the pilot fluid pressure is varied in response to the temperature of the vehicle cooling system. The valve also responds to pressure surges in the fan motor system to control the flow of fluid to the fan motor.

Thus, according to the foregoing detailed description, applicant has provided what is believed to be improved hydraulic apparatus for controlling fluid flow, particularly in a fan motor circuit.

What is claimed is:

1. Apparatus for controlling fluid flow in a hydraulic system: said apparatus comprising a housing having an axially extending bore, an inlet port, an outlet port, a pilot port and a bypass port; a valve element movable in said bore for controlling fluid flow between said inlet port, said outlet port and said bypass port; a pilot fluid pressure actuated device connected with said valve element for moving said valve element in one axial direction and a spring for moving said valve element in the opposite axial direction; said pilot pressure actuated device being in fluid communication with said pilot port; said valve element being axially movable in opposite directions between a first position establishing predetermined flow paths between said inlet port said outlet port and said bypass port, and a second position establishing at least a predetermined flow path between said inlet port and said outlet port; fluid reaction surface means connected with said valve element and disposed in fluid communication with fluid flowing through said valve element, said fluid reaction surface means being designed so that fluid pressure acting thereagainst produces a resultant force on said valve element urging said element toward said first position.

2. Apparatus as defined in claim 1 wherein said valve element comprises flow passages for directing fluid between said inlet port, said outlet port, and said bypass port; a portion of said fluid reaction surface means being remote from said flow passages; and fluid passage means communicating said portion of said fluid reaction surface means with said flow passages in said valve element, whereby fluid flowing through said flow passages in said valve element communicates with said portion of said fluid reaction surface means, said fluid reaction surface means disposed to react with fluid communicated therewith to produce a resultant force on said valve element urging said valve element toward said first position.

3. Apparatus as defined in claim 2 including fluid chamber means associated with said portion of said fluid reaction surface means, said passage means establishing continuous fluid communication between fluid flowing through the flow passages in said valve element and said fluid chamber means, said fluid reaction surface means being designed to react with fluid pressure in said fluid chamber means to continuously produce a resultant fluid force on said valve element urging said valve element toward said first position.

4. Apparatus as defined in claim 3 wherein said valve element comprises an axially extending spool, said fluid reaction surface means including one end surface of said valve spool defining a first reaction surface and another end surface of said valve spool defining a portion of a second reaction surface, said spool having a central opening extending axially therethrough, a valve stem having an axially extending shaft extending through said central opening in said valve spool, said shaft including an enlarged portion at one axial end including a surface defining a part of said second fluid reaction surface, said pilot fluid pressure actuated device connected with the other axial end of said shaft, said spring biasing said valve element into engagement with said enlarged end portion of said valve stem, said shaft being slidable in said central opening and defining a first fluid passage therewith extending between the first and second fluid reaction surfaces, said passage means comprising said first fluid passage and a second fluid passage in said valve spool communicating said flow passages in said spool valve with said first fluid passage, whereby fluid flowing through said flow passage in said valve spool communicates with said first and second reaction surfaces through said first and second fluid passages.

5. Apparatus as defined in claim 4 wherein said first reaction surface reacts with fluid communicated therewith to produce a fluid force on said valve spool in a first axial direction, said second fluid reaction surface formed by said valve member and said enlarged portion of said valve stem having a larger area than said first reaction surface and reacting with fluid in said second chamber to produce a fluid force on said valve spool in a second axial direction opposite to said first axial direction, said passage means establishing continuous fluid communication between fluid flowing through the flow passages in said valve spool and said first and second fluid chamber means, said first and second reaction surfaces being of unequal areas so as to react with fluid pressure to continuously produce a resultant fluid force on said valve spool in the said one axial direction.

6. Apparatus as defined in claim 5 wherein said fluid actuated pressure device includes a pilot piston connected with said valve element, said pilot piston having one side forming said pilot fluid reaction surface, a pilot fluid pressure chamber in fluid communication with said pilot fluid reaction surface, said pilot fluid pressure chamber being in fluid communication with said pilot port, said pilot reaction surface disposed to react with fluid in said pilot chamber to produce a force on said valve spool in the said second axial direction, said spring biasing said valve spool in the first axial direction thereby continuously biasing said valve spool in opposition to an increasing pilot pressure signal and to the resultant force produced by reaction of fluid with said fluid reaction surfaces.

7. Apparatus as defined in claim 6 including first and second closure members fixed with respect to said housing, said first and second closure members forming respective portions of first and second fluid chambers associated respectively with said first and second reaction surfaces, said axially extending shaft extending through said first chamber and said first closure member and having its other axial end fixedly connected with said pilot piston, said spring comprising a helical spring acting between said first closure member and said valve spool and biasing said valve spool into engagement with said enlarged end portion of said valve stem.

8. Apparatus as defined in claim 3 wherein said valve element includes an axially extending spool having at least one axial end surface thereof forming said fluid reaction surface means.

9. Apparatus as defined in claim 8 wherein said fluid actuated pressure device includes a pilot piston, said pilot piston having one side forming a pilot fluid reaction surface, a pilot fluid pressure chamber in fluid communication with said pilot fluid reaction surface, said pilot fluid pressure chamber being in fluid communication with said pilot port, said pilot reaction surface disposed to react with fluid in said pilot chamber to produce a force on said valve spool in the said second axial direction, said spring biasing said valve spool in the first axial direction thereby continuously biasing said valve spool in opposition to an increasing pilot pressure signal and to the resultant force produced by said fluid reaction surface means, said spring further biasing said valve spool into engagement with a portion of said fluid actuated device.

* * * * *